United States Patent
Crooks et al.

(10) Patent No.: US 9,362,723 B2
(45) Date of Patent: Jun. 7, 2016

(54) ELECTRICAL SYSTEM, AND SUPPORT ASSEMBLY AND METHOD OF RACKING ELECTRICAL SWITCHING APPARATUS THEREFOR

(71) Applicant: EATON CORPORATION, Cleveland, OH (US)

(72) Inventors: William Michael Crooks, Sumter, SC (US); Donald Ray Hardee, Sumter, SC (US)

(73) Assignee: EATON CORPORATION, Cleveland, OH (US)

( * ) Notice: Subject to any disclaimer, the term of this patent is extended or adjusted under 35 U.S.C. 154(b) by 232 days.

(21) Appl. No.: 14/264,491

(22) Filed: Apr. 29, 2014

(65) Prior Publication Data

US 2015/0311683 A1  Oct. 29, 2015

(51) Int. Cl.
*H02B 3/00* (2006.01)
*H02B 11/127* (2006.01)

(52) U.S. Cl.
CPC ............ *H02B 3/00* (2013.01); *H02B 11/127* (2013.01)

(58) Field of Classification Search
CPC ....... H02B 11/00; H02B 11/12; H02B 11/127
See application file for complete search history.

(56) References Cited

U.S. PATENT DOCUMENTS

| | | | |
|---|---|---|---|
| 4,351,990 A | 9/1982 | Hesselbart et al. | |
| 5,330,213 A * | 7/1994 | Peruso | B62B 5/0083 280/43.2 |
| 6,404,620 B1 * | 6/2002 | Piccione | H02B 1/52 248/129 |
| 6,897,388 B2 * | 5/2005 | Greer | H02B 3/00 200/200 |
| 6,951,990 B1 * | 10/2005 | Miller | H02B 11/127 200/50.21 |
| 7,057,123 B1 | 6/2006 | Jenkins et al. | |
| 7,368,674 B2 | 5/2008 | Parker et al. | |
| 7,825,344 B2 * | 11/2010 | Stevenson | H02B 11/127 200/50.21 |
| 7,891,622 B1 * | 2/2011 | O'Keene | F16M 11/10 16/358 |
| 8,063,323 B1 * | 11/2011 | Ledbetter | H02B 3/00 200/50.21 |
| 8,070,121 B2 * | 12/2011 | Dozier | F16M 11/10 248/225.21 |
| D661,512 S * | 6/2012 | McRorie | D6/663 |
| 8,553,394 B2 * | 10/2013 | Hawkins | H02B 11/127 200/50.24 |
| 2006/0022096 A1 * | 2/2006 | Chan | A47B 23/046 248/129 |
| 2008/0297103 A1 * | 12/2008 | Windsor | H01M 2/1072 320/101 |
| 2010/0208416 A1 * | 8/2010 | Shoda | H02B 13/075 361/606 |
| 2012/0196461 A1 * | 8/2012 | Jurek | H02B 11/24 439/136 |
| 2012/0199450 A1 | 8/2012 | Bower et al. | |
| 2014/0192455 A1 * | 7/2014 | Yoshida | H02M 7/003 361/605 |

* cited by examiner

*Primary Examiner* — Adrian S Wilson
(74) *Attorney, Agent, or Firm* — Eckart Seamans Cherin & Mellot, LLC; John P. Powers; Philip E. Levy

(57) ABSTRACT

A support assembly is for an electrical system including an electrical enclosure, an electrical switching apparatus removably disposed in the electrical enclosure, and a plate member coupled to the electrical switching apparatus. The plate member includes a distal portion facing away from the electrical enclosure. The electrical switching apparatus includes an operating handle extending through the distal portion. The support assembly includes a base assembly. The base assembly includes a base. The support assembly further includes a number of brace assemblies each coupled to the base and structured to be coupled to the distal portion of the plate member.

20 Claims, 4 Drawing Sheets

ELECTRICAL SYSTEM, AND SUPPORT ASSEMBLY AND METHOD OF RACKING ELECTRICAL SWITCHING APPARATUS THEREFOR

BACKGROUND

1. Field

The disclosed concept pertains generally to electrical systems. The disclosed concept also pertains to support assemblies for electrical systems. The disclosed concept further pertains to methods of racking electrical switching apparatus in electrical systems.

2. Background Information

Electrical switching apparatus used in power distribution systems are often mounted within a switchgear enclosure either individually or in combination with other switchgear (e.g., without limitation, circuit switching devices and circuit interrupters such as circuit breakers, contactors, motor starters, motor controllers and other load controllers).

Some electrical switching apparatus such as, for example, some medium-voltage and low-voltage circuit breakers, can be relatively large. In order to facilitate movement (e.g., installation; removal; maintenance), some circuit breakers are commonly coupled to draw-out mechanisms which permit such circuit breakers to be drawn out of the switchgear enclosure. Accordingly, such circuit breakers are commonly known in the art as "draw-out" circuit breakers. The circuit breaker may be further supported within a draw-out frame, commonly known in the art as a cassette or chassis. The switchgear enclosure generally includes a number of compartments or cells, with each cell being structured to receive a corresponding circuit breaker. The draw-out mechanism (also referred to as the racking assembly) includes, for example, a combination of rails and rollers coupled to one or the other, or both, of the sidewalls of the cell and the sides of the corresponding circuit breaker, which is to be drawn into and out of the cell.

Known draw-out molded case circuit breakers are often too heavy to allow one person to safely lift and/or manipulate the circuit breaker in and out of end use equipment. Additionally, certain draw-out molded case circuit breakers are not available with features allowing the circuit breaker to be supported other than by manual interaction.

Therefore, there is room for improvement in electrical systems and support assemblies therefor.

There is also room for improvement in methods of racking electrical switching apparatus in electrical systems.

SUMMARY

These needs and others are met by embodiments of the disclosed concept, which are directed to a support assembly, and associated method for manipulating electrical switching apparatus in an electrical system.

In accordance with one aspect of the disclosed concept, a support assembly for an electrical system is provided. The electrical system comprises an electrical enclosure, an electrical switching apparatus removably disposed in the electrical enclosure, and a plate member coupled to the electrical switching apparatus. The plate member comprises a distal portion facing away from the electrical enclosure. The electrical switching apparatus comprises an operating handle extending through the distal portion. The support assembly comprises: a base assembly, the base assembly comprising a base; and a number of brace assemblies each coupled to the base and structured to be coupled to the distal portion of the plate member.

As another aspect of the disclosed concept, an electrical system comprises: an electrical enclosure; an electrical switching apparatus removably disposed in the electrical enclosure, the electrical switching apparatus including an operating handle; a plate member coupled to the electrical switching apparatus, the plate member comprising a distal portion facing away from the electrical enclosure, the operating handle extending through the distal portion; and a support assembly comprising: a base assembly, the base assembly including a base; and a number of brace assemblies each coupled to the base. Each of the number of brace assemblies is coupled to the distal portion.

As another aspect of the disclosed concept, a method of racking an electrical switching apparatus in an electrical system is provided. The electrical system comprises an electrical enclosure and an electrical switching apparatus having an operating handle. The method comprises: coupling a plate member to the electrical switching apparatus, the plate member having a distal portion structured to face away from the electrical enclosure, the operating handle extending through the distal portion, providing a support assembly comprising a base assembly and a number of brace assemblies, the base assembly comprising a base, each of the number of brace assemblies being coupled to the base, coupling the number of brace assemblies to the distal portion, and racking the electrical switching apparatus into or out of the electrical enclosure.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
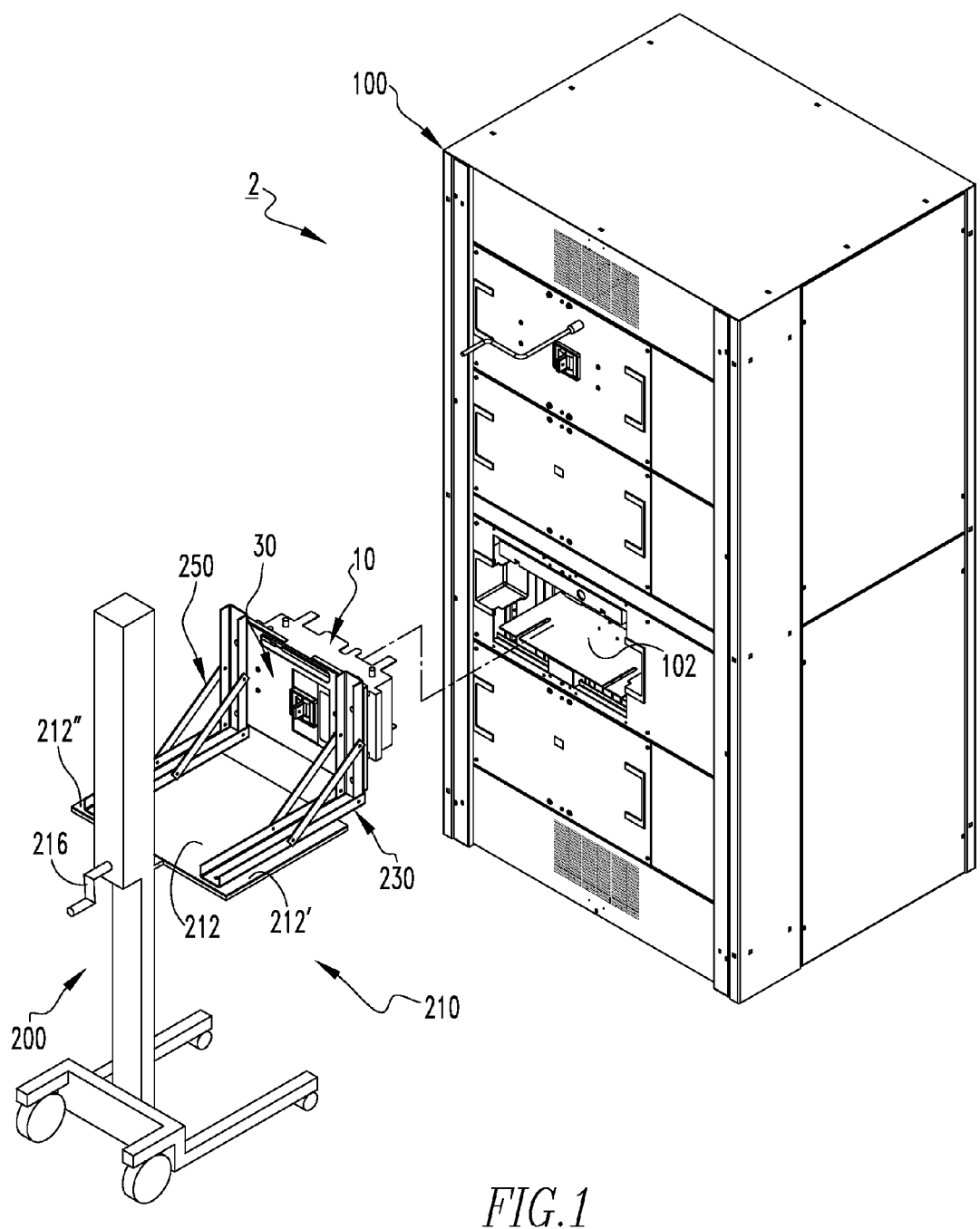
FIG. 1 is an exploded isometric view of an electrical system and support assembly therefor, in accordance with the disclosed concept.

For purposes of the description hereinafter, directional phrases used herein such as, for example, "front", "back", "behind", "side", "right", "left", "upper", "lower", "top", "bottom", and derivatives thereof shall relate to the disclosed concept, as it is oriented in the drawings. It is to be understood that the specific elements illustrated in the drawings and described in the following specification are simply exemplary embodiments of the disclosed concept. Therefore, specific orientations and other physical characteristics related to the embodiments disclosed herein are not to be considered limiting with respect to the scope of the disclosed concept.

As employed herein, the term "number" shall mean one or an integer greater than one (i.e., a plurality).

As employed herein, the term "compartment" shall mean an opening or cell, such as for example and without limitation, an opening in an electrical enclosure within which an electrical switching apparatus may be located.

As employed herein, the statement that two or more parts are "coupled" or "connected" together shall mean that the parts are joined together either directly or joined through one or more intermediate parts.

As employed herein, the statement that two or more parts or components "engage" one another shall mean that the parts touch and/or exert a force against one another either directly or through one or more intermediate parts or components.

FIG. 1 shows an electrical system 2 in accordance with the disclosed concept. The electrical system 2 can generally be stated as including an electrical enclosure 100, a number of electrical switching apparatus (see, e.g., without limitation, molded case circuit breaker 10), a plate member 30, and a support assembly 200. The electrical enclosure 100 has a number of compartments 102. The molded case circuit breaker 10 is structured to be removably located in a corresponding one of the compartments 102. In operation, racking the molded case circuit breaker 10 into and/or out of the compartment 102 may be accomplished by employing the support assembly 200. In this manner, the need for manual interaction with the molded case circuit breaker 10, such as for example and without limitation, during maintenance, installation, and removal of the molded case circuit breaker 10, is significantly lessened. This advantageously results in a safer working environment for personnel, as well as a reduced risk of damage to the molded case circuit breaker 10.

As seen in FIG. 1, the support assembly 200 includes a base assembly 210 and a number of brace assemblies (e.g., without limitation, first and second brace assemblies 230,250) coupled to the base assembly 210. The base assembly 210 includes a base (e.g., without limitation, generally rectangular-shaped platform 212). In the example shown, the base assembly 210 also includes a lift mechanism 216 coupled to the platform 212. The lift mechanism 216 operates in a generally well known manner to raise and lower the platform 212. It will be appreciated that the lift mechanism 216 may be any known or suitable mechanical, hydraulic, pneumatic, or electrical lift mechanism.

The platform 212 includes a first end portion 212' and a second end portion 212" opposite and spaced from the first end portion 212'. The first brace assembly 230 is preferably coupled to the first end portion 212' and the second brace assembly 250 is preferably coupled to the second end portion 212". In this manner, weight that is supported by the support assembly 200, such as for example and without limitation, the weight of the plate member 30, as well as the weight of the molded case circuit breaker 10, will advantageously be more evenly distributed across the platform 212.

Figure 2A:
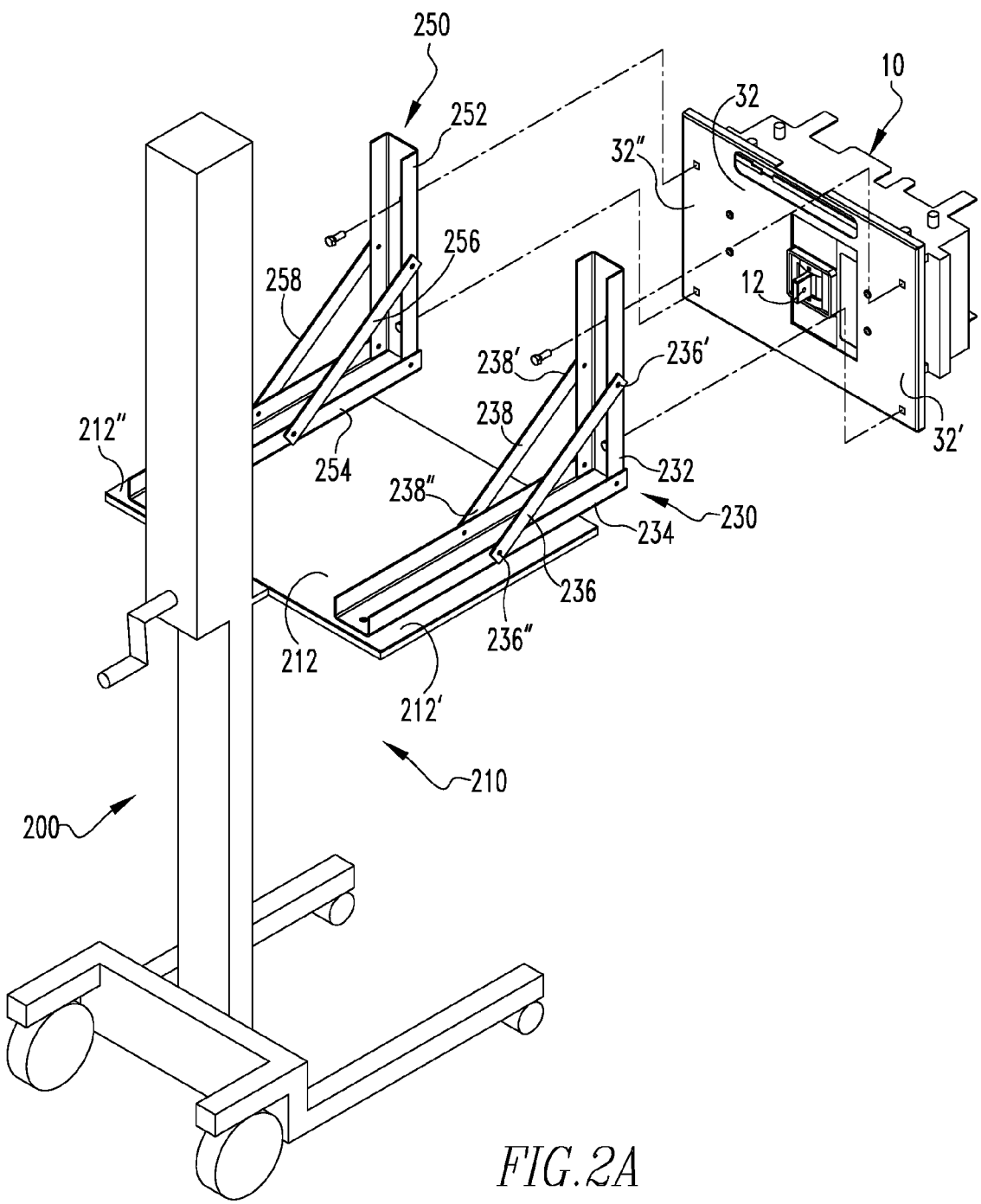
FIGS. 2A and 2B are exploded isometric views of a portion of the electrical system and support assembly therefor.
Figure 2B:
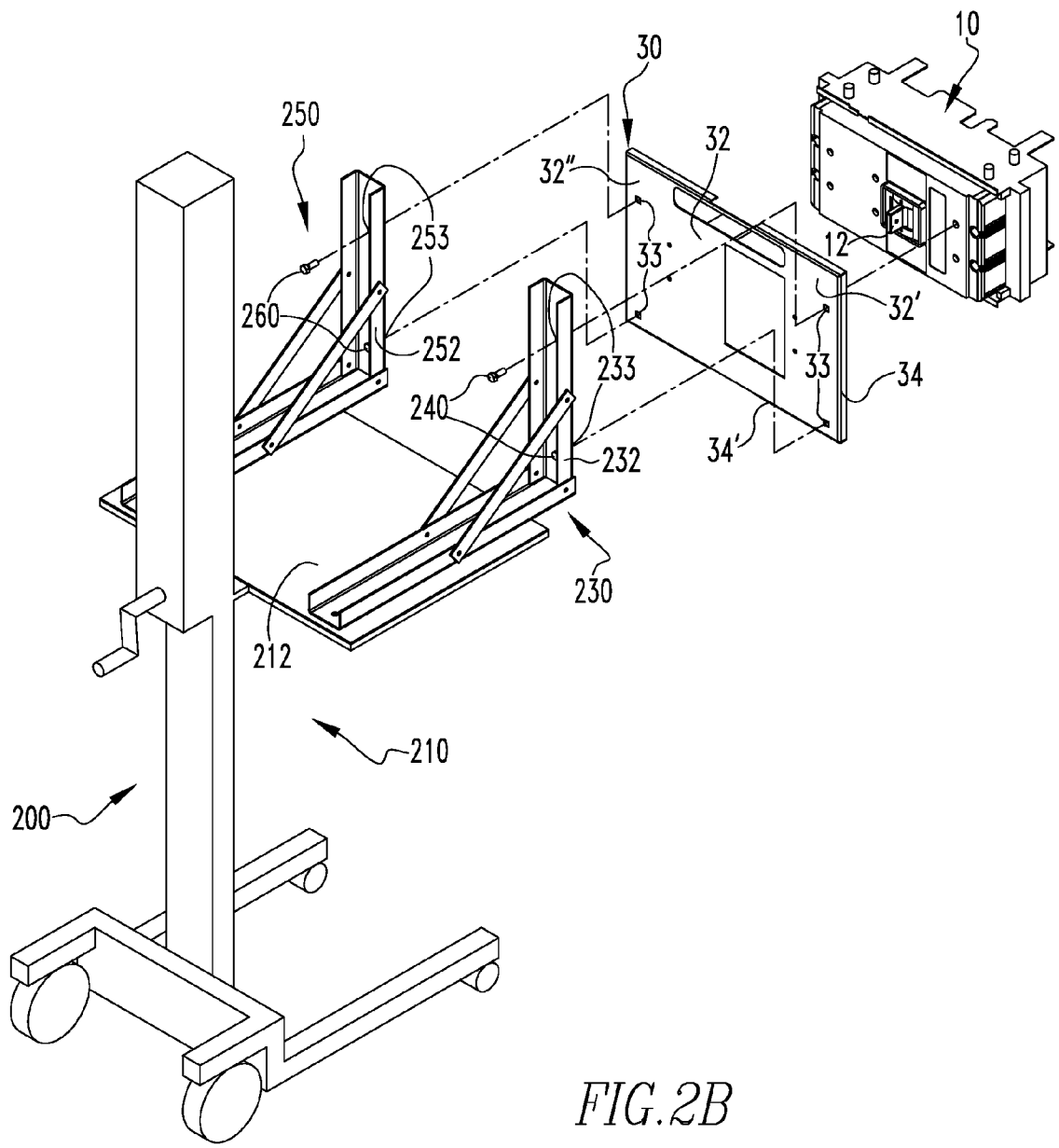

Referring to FIGS. 2A and 2B, the plate member 30 includes a distal portion (e.g., without limitation, generally rectangular-shaped planar surface 32). The molded case circuit breaker 10 includes an operating handle 12 that extends through the planar surface 32, as shown. Thus, when attached to the molded case circuit breaker 10, the platform 212 is structured to be normal to the planar surface 32. Extending from the planar surface 32 are a plurality of side walls 34,34'. As will be discussed below, in operation, the support assembly 200 is structured to engage the planar surface 32 and is explicitly designed not to engage the side walls 34,34'. Additionally, as the side walls 34,34' extend away from the planar surface 32, the planar surface 32 can be considered to be the front of the plate member 30. In other words, and as will be discussed below in association with FIG. 3, the planar surface 32 is the external most portion of the plate member 30 with respect to the electrical enclosure 100 when the molded case circuit breaker 10 is located in the electrical enclosure 100.

As seen in FIGS. 2A and 2B, the planar surface 32 has a first end portion 32' and a second end portion 32" opposite and spaced from the first end portion 32'. In operation, the first brace assembly 230 is coupled to the first end portion 32' and the second brace assembly 250 is coupled to the second portion 32". In this manner, when the molded case circuit breaker 10 is located outside of the electrical enclosure 100 and the brace assemblies 230,250 are coupled to the planar surface 32, the support assembly 200, and not an operator, advantageously bears the weight of the molded case circuit breaker 10, which can be relatively heavy.

Figure 3:
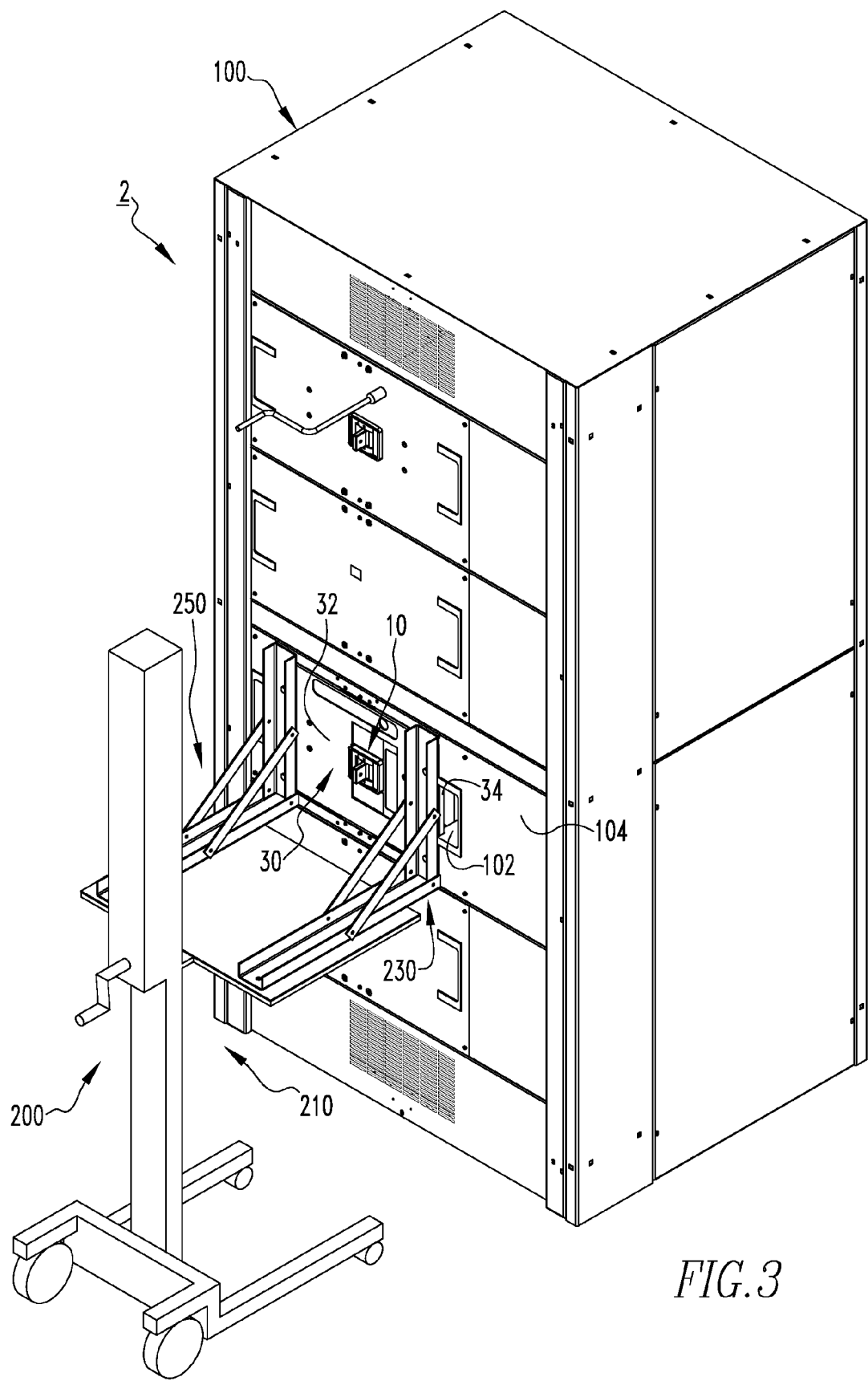
FIG. 3 is an isometric view of the electrical system and support assembly therefor of FIG. 1, modified to show the electrical switching apparatus in the installed position.

Additionally, as the aforementioned lift mechanism 216 is coupled to the platform 212 and the platform 212 is coupled to the brace assemblies 230,250, an operator can employ the lift mechanism 216 to raise and lower the platform 212 (e.g., and thus the molded case circuit breaker 10) when the molded case circuit breaker 10 is not located in the electrical enclosure 100 (FIGS. 1 and 3). Thus, the need for manual interaction, such as the need to manually raise or lower the molded case circuit breaker 10 during maintenance, installation, and/or removal of the molded case circuit breaker 10, is advantageously further reduced by employing the lift mechanism 216. Again, this results in a significantly safer working environment. It also reduces risk of damage to the molded case circuit breaker 10, caused, for example, by mishandling the molded case circuit breaker 10 during manual interaction.

Continuing to refer to FIG. 2A, the first brace assembly 230 includes a plurality of elongated brace members 232,234, 236,238. The elongated member 232 is coupled to the elongated member 234, and disposed normal with respect thereto. The elongated members 236,238 operate to stabilize the first brace assembly 230. In the non-limiting example shown and described herein, the elongated members 236,238 each include corresponding first end portions 236',238' coupled to the elongated member 232, and further include corresponding second end portions 236",238" coupled to the elongated member 234. Although the elongated members 236,238 are generally coupled to central portions on the outside of the elongated members 232,234, it is within the scope of the disclosed concept to employ an alternative arrangement of elongated members (not shown), for example and without limitation, coupled to end portions, to internal portions or other portions on the elongated members 232,234 suitable for stabilizing the first brace assembly 230.

As seen in FIG. 2A, the second brace assembly 250 includes a plurality of elongated brace members 252,254, 256,258. It will be appreciated that the elongated members 252,254,256,258 of the second brace assembly 250 are preferably shaped and configured substantially the same as the elongated members 232,234,236,238 of the first brace assembly 230. Although the disclosed concept has been described in association with the first and second brace assemblies 230, 250, it is within the scope of the disclosed concept to have any suitable alternative number and/or configuration of brace assemblies (not shown). For example and without limitation, it is within the scope of the disclosed concept for a support assembly (not shown) to employ a single brace assembly located in a central location of a platform or to employ three or more brace assemblies at different locations on a platform such as, for example, to support a circuit breaker (not shown) larger than the molded case circuit breaker 10. It is also within the scope of the disclosed concept for a support assembly (not shown) to employ a brace assembly having other than two of the elongated members 236,238 (e.g., without limitation, wherein a brace assembly does not include either of the elongated members 236,238, or wherein a brace assembly includes the elongated members 236,238 in addition to other similar members (not shown) for further stability).

Referring to FIG. 2B, the elongated member 232 includes a pair of apertures 233 and the elongated member 252 includes a pair of apertures 253. The planar surface 32 has a plurality of through holes 33 (four are shown), each structured to be aligned with a corresponding one of the apertures 233,253 of the elongated members 232,252, respectively. Additionally, each of the brace assemblies 230,250 includes a corresponding number of coupling members (two coupling members 240 and two coupling members 260 are shown) structured to extend through the apertures 233,253 and the through holes 33. In this manner, the coupling members 240, 260 are structured to couple the brace assemblies 230,250 to the planar surface 32 of the plate member 30. It will be appreciated that the coupling members 240,260 may be threaded fasteners, push pins, locking pins, or any other known or suitable coupling mechanism. It will further be appreciated that although the disclosed concept has been described in association with each of the elongated members 232,252 having a pair of apertures 233,253 and each of the brace assemblies 230,250 having two coupling members 240, 260, it is within the scope of the disclosed concept to employ any suitable alternative number of apertures and coupling members (not shown).

As seen in FIG. 3, the molded case circuit breaker 10 is shown as employed within the compartment 102 of the electrical enclosure 100. As seen, the only portion of the plate member 30 to which the brace assemblies 230,250 are coupled is the planar surface 32. In other words, the support assembly 200 does not engages the side walls 34,34' of the plate member 30. Furthermore, the support assembly 200 does not engage any portion of the molded case circuit breaker 10.

Continuing to refer to FIG. 3, when the molded case circuit breaker 10 is located in the compartment 102 of the electrical enclosure 100, the planar surface 32 of the plate member 30 faces away from the electrical enclosure 100 and is generally flush with a corresponding exterior surface 104 of the electrical enclosure 100. Accordingly, with the exception of the coupling members 240,260 (FIG. 2B), no portion of the support assembly 200 is structured to extend past the exterior surface 104 and into the electrical enclosure 100. Thus, an operator desiring to remove or install the molded case circuit breaker 10 will not have to reach inside the electrical enclosure 100. Rather, the operator will interact with the planar surface 32, a portion of the electrical system 2 that is significantly easier to access. Additionally, electrical switching apparatus (e.g., without limitation, the molded case circuit breaker 10) often do not have structural features to allow for lifting and manipulating other than by manual interaction. Thus, the support assembly 200 provides an additional benefit in that no modification to the molded case circuit breaker 10 is required while racking the molded case circuit breaker 10 into and/or out of the electrical enclosure 100.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A support assembly for an electrical system, the electrical system comprising an electrical enclosure, an electrical switching apparatus removably disposed in the electrical enclosure, and a plate member coupled to the electrical switching apparatus, the plate member comprising a distal portion facing away from the electrical enclosure, the electrical switching apparatus comprising an operating handle extending through the distal portion, the support assembly comprising:
   a base assembly, the base assembly comprising a base; and
   a number of brace assemblies each coupled to the base and structured to be coupled to the distal portion of the plate member.

2. The support assembly of claim 1 wherein the number of brace assemblies includes a first brace assembly and a second brace assembly; and wherein each of the first and second brace assemblies includes a plurality of brace members.

3. The support assembly of claim 2 wherein the plurality of brace members is a first elongated member, a second elongated member, a third elongated member, and a fourth elongated member; wherein the second elongated member is normal to and coupled to the first elongated member; wherein the third elongated member has a first end coupled to the first elongated member and a second end coupled to the second elongated member; and wherein the fourth elongated member has a first end coupled to the first elongated member and a second end coupled to the second elongated member.

4. The support assembly of claim 2 wherein the base is a rectangular platform having a first end portion and a second end portion spaced from the first end portion; wherein the platform is structured to be normal to the distal portion; wherein the first brace assembly is coupled to the first end portion of the platform; and wherein the second brace assembly is coupled to the second end portion of the platform.

5. The support assembly of claim 2 wherein the plurality of brace members comprises an elongated member having a number of apertures; wherein the distal portion has a plurality of through holes; and wherein each brace assembly further comprises a number of coupling members each extending through a corresponding one of the number of apertures and a corresponding one of the number of through holes.

6. The support assembly of claim 5 wherein each of the coupling members is selected from the group consisting of threaded fasteners, push pins, and locking pins.

7. The support assembly of claim 5 wherein the elongated member has two apertures.

8. The support assembly of claim 1 wherein the base assembly further comprises a lift mechanism; and wherein the lift mechanism is coupled to the base.

9. An electrical system comprising:
   an electrical enclosure;
   an electrical switching apparatus removably disposed in the electrical enclosure, the electrical switching apparatus comprising an operating handle;
   a plate member coupled to the electrical switching apparatus, the plate member comprising a distal portion facing away from the electrical enclosure, the operating handle extending through the distal portion; and
   a support assembly comprising:
      a base assembly, the base assembly comprising a base; and
      a number of brace assemblies each coupled to the base, wherein each of the number of brace assemblies is coupled to the distal portion of the plate member.

10. The electrical system of claim 9 wherein the number of brace assemblies includes a first brace assembly and a second brace assembly; and wherein each of the first and second brace assemblies includes a plurality of brace members.

11. The electrical system of claim 10 wherein the plurality of brace members is a first elongated member, a second elongated member, a third elongated member, and a fourth elongated member; wherein the second elongated member is normal to and coupled to the first elongated member; wherein the third elongated member has a first end coupled to the first elongated member and a second end coupled to the second elongated member; and wherein the fourth elongated member has a first end coupled to the first elongated member and a second end coupled to the second elongated member.

12. The electrical system of claim 10 wherein the base is a rectangular platform, the platform having a first end portion and a second end portion spaced from the first end portion; wherein the platform is normal to the distal portion; wherein the first brace assembly is coupled to the first end portion of the platform; and wherein the second brace assembly is coupled to the second end portion of the platform.

13. The electrical system of claim 10 wherein the distal portion is a generally rectangular shaped planar surface comprising a first end portion and a second end portion spaced from the first end portion; wherein the first brace assembly is coupled to the first end portion of the planar surface; and wherein the second brace assembly is coupled to the second end portion of the planar surface.

14. The electrical system of claim 9 wherein each of the number of brace assemblies comprises a number of coupling members and an elongated member having a number of apertures; wherein the distal portion has a number of through holes; and wherein each coupling member extends through a corresponding one of the number of apertures and a corresponding one of the number of through holes.

15. The electrical system of claim 9 wherein the base assembly further comprises a lift mechanism; wherein the lift mechanism is coupled to the base; and wherein the lift mechanism is selected from the group consisting of mechanical, hydraulic, pneumatic, and electrical lift mechanisms.

16. A method of racking an electrical switching apparatus in an electrical system including an electrical enclosure and an electrical switching apparatus having an operating handle, the method comprising:
    coupling a plate member to the electrical switching apparatus, the plate member having a distal portion structured to face away from the electrical enclosure, the operating handle extending through the distal portion,
    providing a support assembly comprising:
        a base assembly comprising a base, and
        a number of brace assemblies being coupled to the base,
    coupling the number of brace assemblies to the distal portion of the plate member, and
    racking the electrical switching apparatus into or out of the electrical enclosure.

17. The method of claim 16 wherein the base assembly further comprises a lift mechanism coupled to said base; and wherein the method further comprises:
    moving said base up or down with said lift mechanism to align said electrical switching apparatus with said electrical enclosure.

18. The method of claim 16 wherein the base assembly further comprises a lift mechanism coupled to said base; and wherein the method further comprises:
    moving said lift mechanism and said support assembly to move said electrical switching apparatus away from said electrical enclosure.

19. The method of claim 16 wherein the number of brace assemblies includes a first brace assembly and a second brace assembly; wherein each of said first brace assembly and said second brace assembly includes an elongated member having a pair of apertures; wherein said distal portion has four through holes; and wherein the coupling step further comprises:
    providing four coupling members, and
    inserting each of the four coupling members through a corresponding one of the apertures and a corresponding one of the through holes.

20. The method of claim 16 wherein the number of brace assemblies includes a first brace assembly and a second brace assembly; wherein the distal portion is a planar surface comprising a first end portion and a second end portion spaced from the first end portion; and wherein said coupling step further comprises:
    coupling the first brace assembly to the first end portion of the planar surface, and
    coupling the second brace assembly to the second end portion of the planar surface.

* * * * *